Oct. 17, 1933.　　　　J. W. WEST　　　　1,930,916
CONFECTION MOLD
Filed Oct. 10, 1932　　2 Sheets-Sheet 1
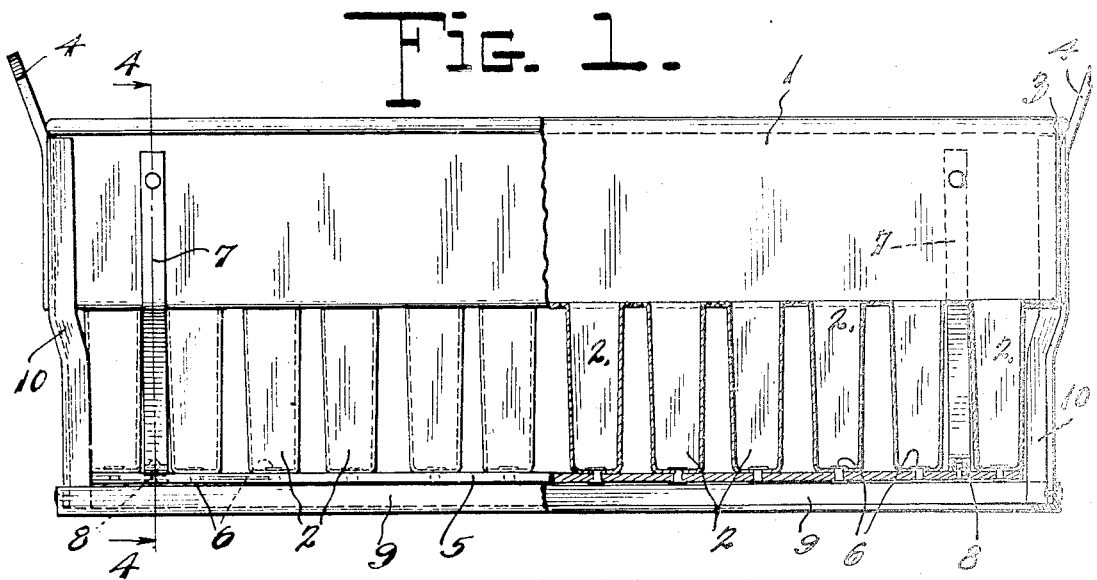
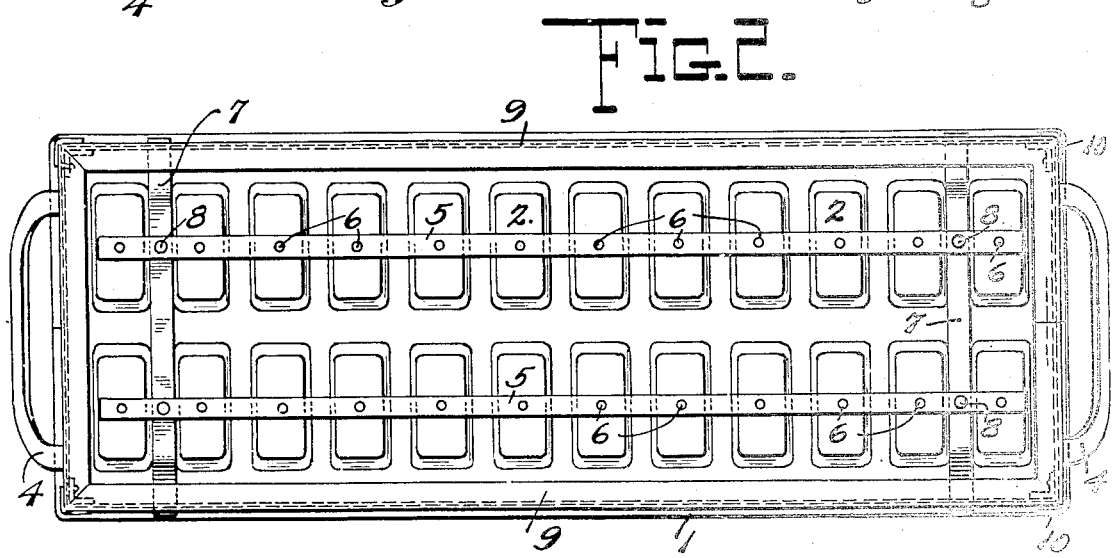
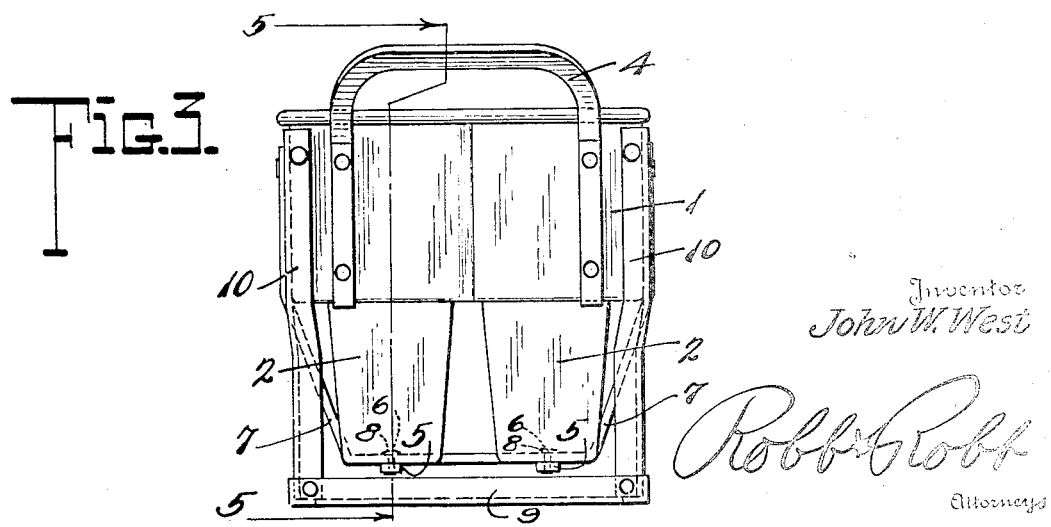
Inventor
John W. West
Robb & Robb
Attorneys Oct. 17, 1933.                 J. W. WEST                 1,930,916
                           CONFECTION MOLD
                      Filed Oct. 10, 1932          2 Sheets-Sheet 2
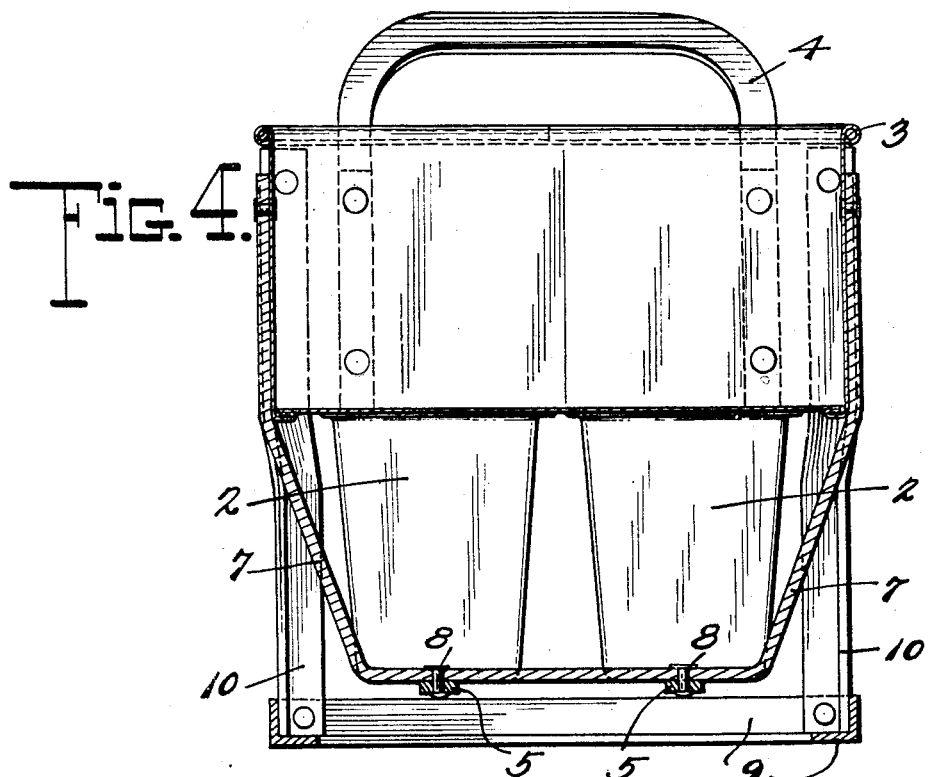
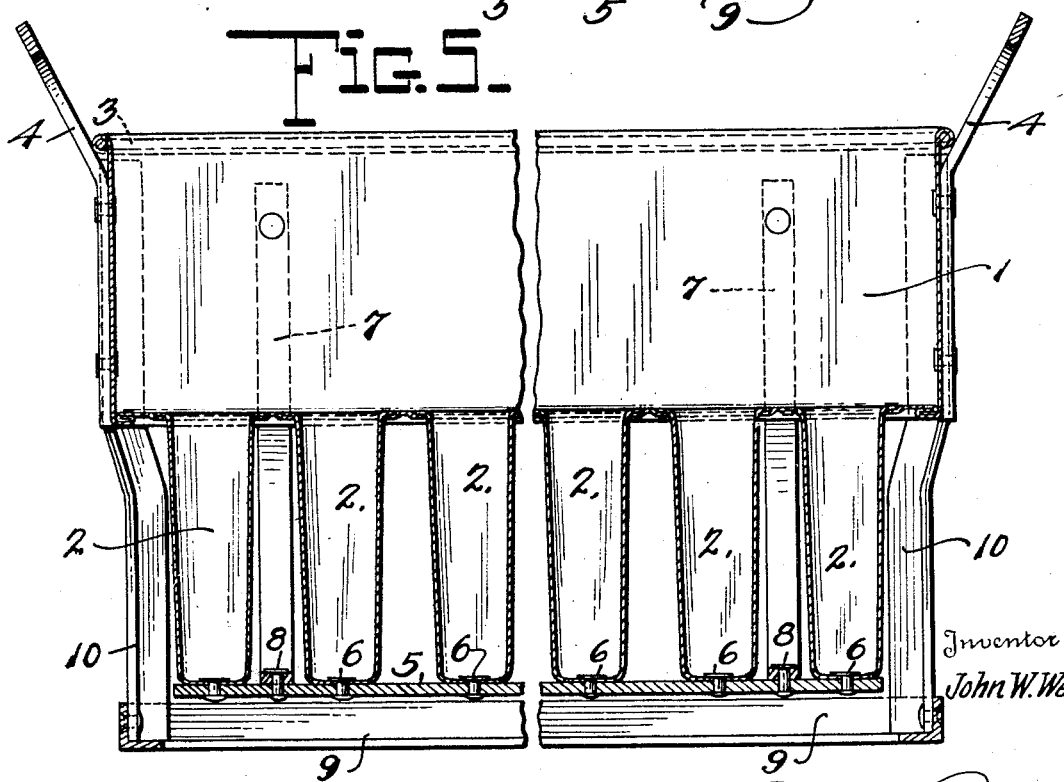

Patented Oct. 17, 1933

1,930,916

UNITED STATES PATENT OFFICE 1,930,916

CONFECTION MOLD

John W. West, New York, N. Y., assignor, by mesne assignments, to Good Humor Corporation of America Application October 10, 1932. Serial No. 637,192

4 Claims. (Cl. 107—19)

The present invention relates to improvements in confection molds of that type designed to hold liquid substances during the process of freezing the same onto sticks, the products being well known as "Good Humors", "Cheerios", and the like.

These mold devices are constructed to mold a plurality of individual confections at one time and to this end a unit comprises a hopper section from which depend in rows a series of mold receptacles.

Heretofore it has been proposed to provide such units with braces connecting the various receptacles and runners connected to certain rows of the same, but in view of the abuses to which these units are subjected such arrangement does not afford the best measure of protection to the unit.

It is the object of these improvements to provide a runner support arrangement for the unit which is independent of the mold receptacles and at the same time constitutes a guard or protection for said receptacles effectively preventing damage in handling during molding or at other times.

A further object is to provide a system of reinforcement or bracing for the mold receptacles rigidly holding them transversely and longitudinally.

To this end my invention consists in the novel details of construction, and in the combination, connection and arrangement of parts hereinafter more specifically described and pointed out in the claims.

In the accompanying drawings,

Fig. 1 is a side elevation of a mold unit constructed in accordance with my invention, partly broken away and shown in section.

Fig. 2 is a bottom plan view.

Fig. 3 is an end view.

Fig. 4 is a transverse sectional view on the line 4—4 of Fig. 1, and

Fig. 5 is a longitudinal sectional view on the line 5—5 of Fig. 3.

Like reference numerals refer to like parts in the several figures of the drawings.

In accordance with my invention, the unit comprises the hopper section 1, rectangular in form and having the size or capacity which corresponds to the capacity of the combined individual mold receptacles 2 depending therefrom. The upper edge of the hopper material is rolled about a reinforcing wire or rod thereby strengthening the receptacle very effectively at this point. At each end is attached a handle strap 4 as shown best in Fig. 3.

The mouths of the mold receptacles 2 are preferably soldered or otherwise rigidly connected about the edges of openings cut or stamped at spaced intervals in the bottom of the section 1, these receptacles preferably being rectangular and tapered slightly toward the bottom so as to facilitate removal of the molded article therefrom. It will be observed that the mold receptacles are arranged in two rows of 12 each but obviously I do not wish to be confined to this particular arrangement or to the particular number or shape shown. It is only desirable that the individual molds shall be spaced apart so that the brine in which the unit is usually disposed for freezing may have access to the complete receptacle.

A bracing system for these receptacles comprises the longitudinal straps or bars 5 connected to the respective rows at the bottom by means of rivets 6 extending thru the bottoms of the receptacles as shown clearly in Fig. 1, and a transverse strap 7 adjacent each end of the unit. The ends of the straps 7 extend upwardly and are riveted to the side walls of the hopper 1, while at intermediate points rivets 8 connect them to the longitudinal straps 5. Thus the stresses on the bottoms of the receptacles are transferred to the strong walls of the pan hopper and a very rigid arrangement is provided.

Instead of allowing the units to rest or move upon the bottoms of the mold receptacles, I provide a support in the form of a rectangular frame 9, preferably composed of angle bars, which frame is connected to the corners of the hopper pan 1 by the upright angle bars 10 so that the frame is arranged below and in spaced relation to the mold receptacles. This frame 9 constitutes a strong and rigid runner support and with its uprights forms a guard for the mold receptacles 2.

What I claim and desire to secure by Letters Patent is:—

1. A mold unit for confections comprising a pan, a plurality of mold receptacles depending therefrom, and a runner support extending from the pan in spaced relation to the mold receptacles.

2. A mold unit for frozen confections comprising a hopper pan, mold receptacles depending therefrom, and a support for said unit comprising longitudinally extending runners and uprights connecting the runners to the hopper pan.

3. A mold unit for confections comprising a hopper pan, mold receptacles depending therefrom in rows, means for fixedly connecting the receptacles together, and additional brace means extending from the pan and connected to the last named means.

4. A mold unit for frozen confections comprising a hopper pan, a plurality of mold receptacles depending from said pan, means for securing together the lower portions of the mold receptacles and supporting means separate from said mold receptacles and connected to the pan.

JOHN W. WEST.